United States Patent
Carmona

(10) Patent No.: US 11,148,509 B2
(45) Date of Patent: Oct. 19, 2021

(54) AUTOMATED RETRACTABLE SUN SHIELD SYSTEM

(71) Applicant: KARMA AUTOMOTIVE LLC, Irvine, CA (US)

(72) Inventor: Onix Isaac Carmona, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 35 days.

(21) Appl. No.: 16/523,704

(22) Filed: Jul. 26, 2019

(65) Prior Publication Data
US 2021/0023917 A1    Jan. 28, 2021

(51) Int. Cl.
*B60J 3/02*      (2006.01)

(52) U.S. Cl.
CPC .................... *B60J 3/0213* (2013.01)

(58) Field of Classification Search
CPC ...... B60J 1/2066; B60J 1/2075; B60J 1/2077; B60J 1/208; B60J 1/2083; B60J 1/2086; B60J 1/2016; B60J 1/2019; B60J 1/2052; B60J 3/0213
USPC ....................................................... 296/97.8
See application file for complete search history.

(56) References Cited

U.S. PATENT DOCUMENTS

| | | | |
|---|---|---|---|
| 7,140,663 B1* | 11/2006 | Thacker | B60J 3/02 296/97.4 |
| 8,162,376 B1 | 4/2012 | Grossmith | |
| 8,366,172 B1 | 2/2013 | Morazan | |
| 8,960,261 B1* | 2/2015 | Williams | B60J 1/2025 160/370.22 |
| 2009/0078379 A1* | 3/2009 | Hansen | B60J 1/2033 160/265 |
| 2012/0193935 A1* | 8/2012 | Lin | B60J 1/2038 296/97.8 |

* cited by examiner

*Primary Examiner* — Joseph D. Pape
(74) *Attorney, Agent, or Firm* — Gordon Rees Scully Mansukhani, LLP

(57) ABSTRACT

An automated retractable sun shield system for a vehicle, comprising a sun shield, a deployment mechanism, a roller, a tension bar, and a controller. The sun shield includes a flexible material which blocks sunlight. The deployment mechanism operates to deploy and retract the sun shield. The sun shield wraps around the roller so that the sun shield is in a rolled configuration when the sun shield is retracted and stored. The tension bar guides the sun shield to match a shape of the tension bar when the sun shield is deployed. At least one element comprising the sun shield system is installed and concealed behind a dashboard valence panel of the vehicle. At least one element comprising the sun shield system is installed and concealed behind an interior trim covering a vertical support of the vehicle.

17 Claims, 5 Drawing Sheets

AUTOMATED RETRACTABLE SUN SHIELD SYSTEM

BACKGROUND

The present disclosure relates to an automated retractable sun shield system for a vehicle.

Vehicles parked in open or partial sunlight are prone to overheating. Given that a parked vehicle rarely runs its climate control system, the temperature of a parked vehicle exposed to sunlight tends to climb to alarming levels before the vehicle operator returns. Apart from being a major discomfort to vehicle occupants as the climate control system works to return the temperature to a tolerable level, the sunlight exposure and raised temperature may risk damage to items kept inside the passenger compartment.

A number of solutions exist for keeping parked vehicles from overheating, each falling short in one way or another. The accordion-style sun shields often used by consumers are cumbersome, likely to leave parts of the vehicle interior exposed, and require a significant time investment to deploy. Moreover, a person in a rush may forget to deploy the sun shield. Automated sun shield systems exist, but the ones available on the market have exposed mechanical parts that present an additional risk of failure and are aesthetically unpleasing. Furthermore, as these automated sun shield systems are installed after purchase of the vehicle, they almost never offer complete coverage of the window they are meant to protect from sunlight. The umbrella-style automated vehicle sunshade of U.S. Pat. No. 8,366,172 presents a more complete solution, but as an exterior vehicle sunshade it incurs even more risk of damage from external elements, even while stowed, and the rooftop compartment used to stow the sunshade disrupts the aerodynamics of the vehicle.

It is desirable to find an automated sun shield system that protects its working components while complementing the design of the vehicle in which it is installed.

SUMMARY

Disclosed herein is an automated retractable sun shield system for a vehicle. In one embodiment, the sun shield system comprises a sun shield, a deployment mechanism, a roller, a tension bar, and a controller. In one embodiment, the sun shield includes a flexible material which blocks sunlight. Accordingly, the sun shield may comprise translucent or opaque material. In one embodiment, the deployment mechanism operates to deploy and retract the sun shield. In one embodiment, the sun shield wraps around the roller so that the sun shield is in a rolled configuration when the sun shield is retracted and stored. In one embodiment, the tension bar guides the sun shield to match a shape of the tension bar when the sun shield is deployed. In one embodiment, the controller receives input from other systems of the vehicle and controls the operation of the sun shield system according to the received input.

In another disclosed embodiment, the deployment mechanism comprises at least one rotating motor for driving the deployment and retraction of the sun shield, a plurality of motor chains, a plurality of guide rails, and a plurality of retaining bars. In another disclosed embodiment, each motor chain translates the rotary motion of the at least one motor into a linear motion of the sun shield. In another disclosed embodiment, each guide rail acts as a guide for one of the motor chains in the plurality of motor chains and as a guide for the linear motion of the sun shield. In another disclosed embodiment, each retaining bar provides tension at one end of one of the motor chains in the plurality of motor chains.

In another disclosed embodiment, at least one of the roller and tension bar is installed and concealed behind a dashboard valence panel of the vehicle. In another disclosed embodiment, at least one element comprising the deployment mechanism is installed and concealed behind an interior trim covering a vertical support of the vehicle. In another disclosed embodiment, at least one of the motors in the plurality of motors is installed and concealed behind a dashboard valence panel of the vehicle.

In another disclosed embodiment, the sun shield partially blocks sunlight. In another disclosed embodiment, the sun shield includes a reflective material.

In another disclosed embodiment, deployment of the sun shield includes deploying the sun shield in an upwards direction.

In another disclosed embodiment, the controller deploys the sun shield when the controller receives an input signal indicating that an engine of the vehicle has been turned off or an input signal indicating that the vehicle has shifted to a park gear state. In another disclosed embodiment, the controller retracts the sun shield when the controller receives an input signal indicating that an engine of the vehicle has been turned on. In another disclosed embodiment, the controller responds to an input signal from a user interface of the vehicle.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to an automated retractable sun shield system for a vehicle.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative systems described herein may be combined in a single system, but the application is not limited to the specific exemplary combinations of systems that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "vertical" is used to describe a component's general orientation and should not be taken to mean that the component is necessarily completely upright or orthogonal to a horizontal structure.

References throughout this document to "sunlight" should be understood to apply similarly to other sources of light, such as moonlight or a spotlight.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
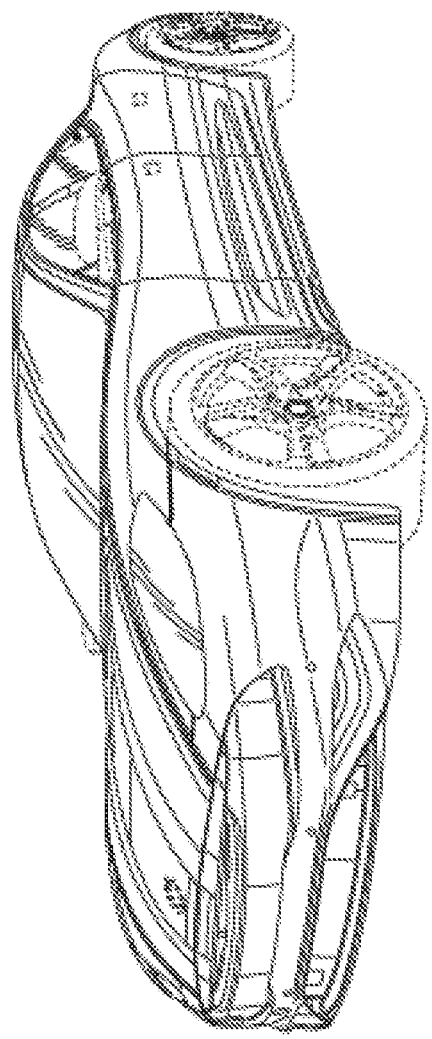
FIG. 1 is a perspective view depicting an exemplary embodiment of a vehicle that may include an automated retractable sun shield system.

FIG. 1 is a perspective view depicting an exemplary embodiment of a vehicle 100 that may include an automated retractable sun shield system 200. The vehicle 100 shown in FIG. 1 is exemplary. The automated retractable sun shield system 200 may be installed in any vehicle with use for a sun shield, especially a vehicle with a windshield.

Figure 2A:
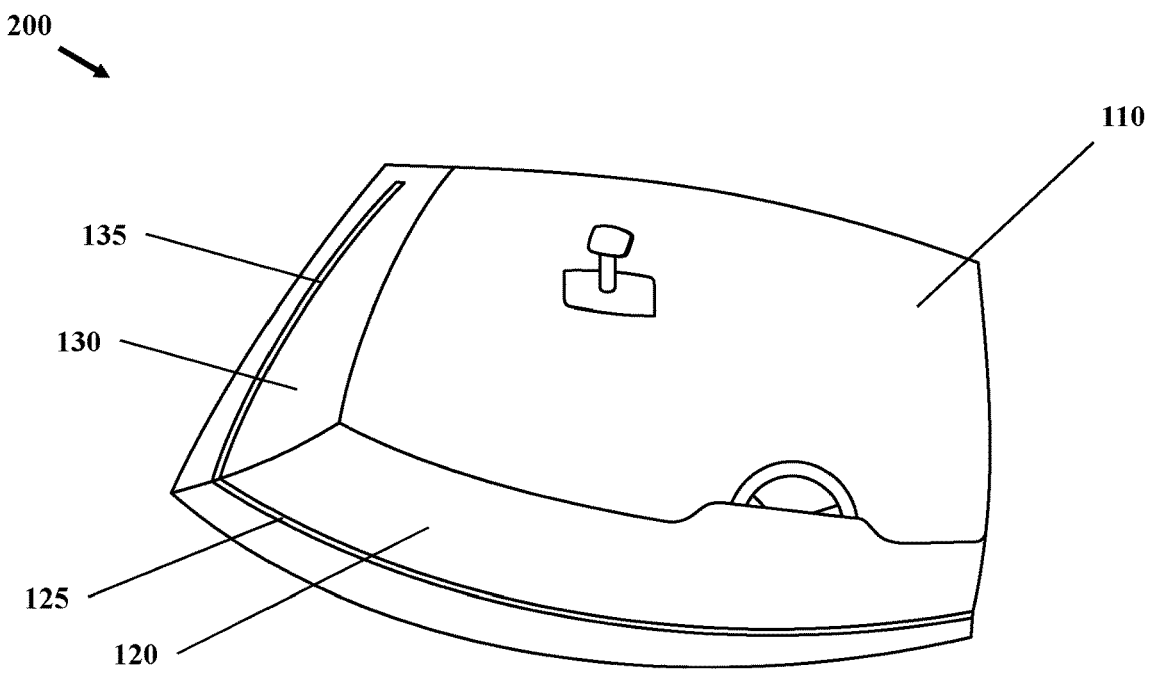
FIG. 2A is a perspective view depicting an exemplary embodiment of a vehicle windshield with an automated retractable sun shield system installed, wherein a sun shield of the sun shield system is retracted and stored.
Figure 2B:
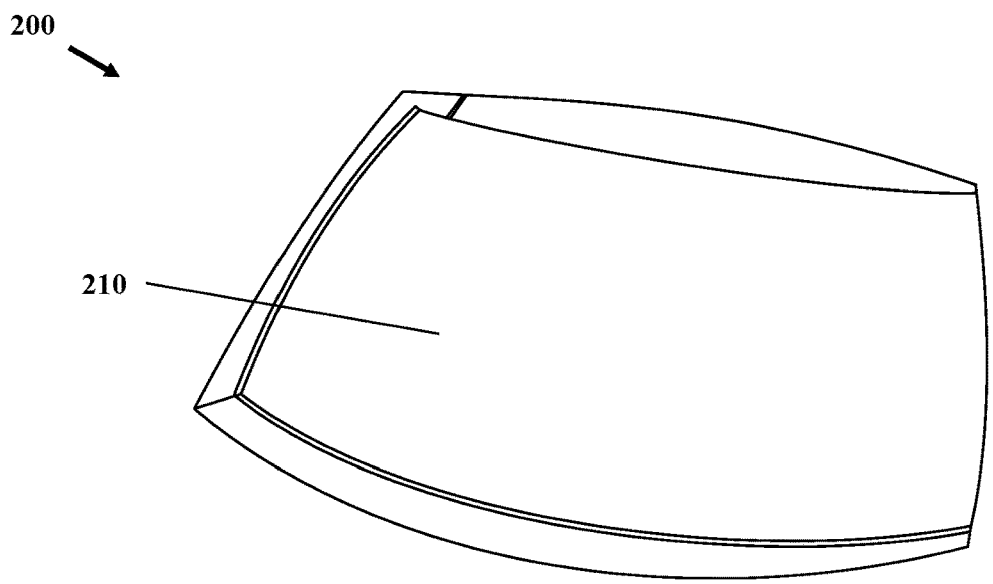
FIG. 2B is a perspective view depicting the vehicle windshield of FIG. 2A with an automated retractable sun shield system installed, wherein the sun shield is deployed.

FIG. 2A is a perspective view depicting an exemplary embodiment of a vehicle windshield 110 with an automated retractable sun shield system 200 installed, wherein a sun shield 210 of the sun shield system 200 is retracted and stored. FIG. 2B is a perspective view depicting the vehicle windshield 110 of FIG. 2A with an automated retractable sun shield system 200 installed, wherein the sun shield 210 is deployed. In one embodiment, the vehicle 100 may include a dashboard valence panel 120 and at least one vertical support 130. In one embodiment, the at least one vertical support 130 may be an "A-pillar". In one embodiment, the at least one vertical support 130 may be covered by an interior trim 131.

In one embodiment, the dashboard valence panel 120 may conceal at least one of the components of the sun shield system 200. The dashboard valence panel 120 may include a horizontal opening 125 that allows for the sun shield system 200 to deploy the sun shield 210 across the vehicle windshield 110 while keeping the other components of the sun shield system 200 concealed. In one embodiment, the interior trim 131 of at least one vertical support 130 may conceal at least one of the components of the sun shield system 200. The interior trim 131 of the at least one vertical support 130 may include a vertical opening 135 that allows for the sun shield system 200 to deploy the sun shield 210 across the vehicle windshield 110 while keeping the other components of the sun shield system 200 concealed.

Figure 3A:
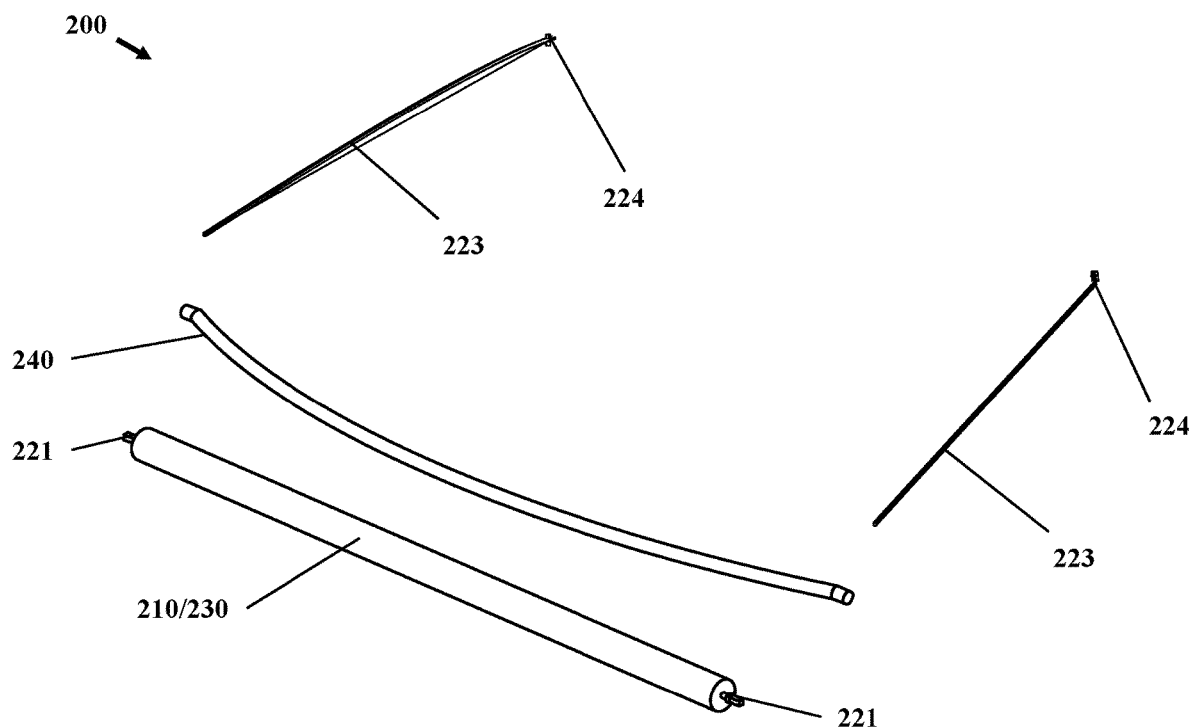
FIG. 3A is an exploded isometric view depicting an exemplary embodiment of an automated retractable sun shield system, wherein a sun shield of the sun shield system is retracted and stored.
Figure 3B:
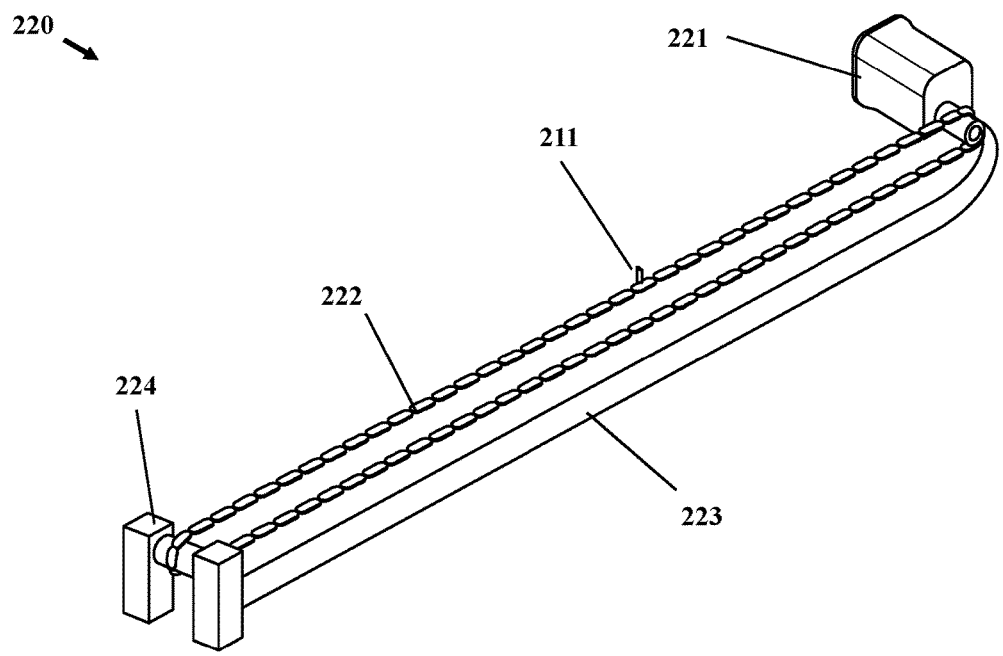
FIG. 3B is an isometric view of a deployment mechanism of the sun shield system of FIG. 3A, wherein a motor is installed at the upper end of the deployment mechanism.
Figure 3C:
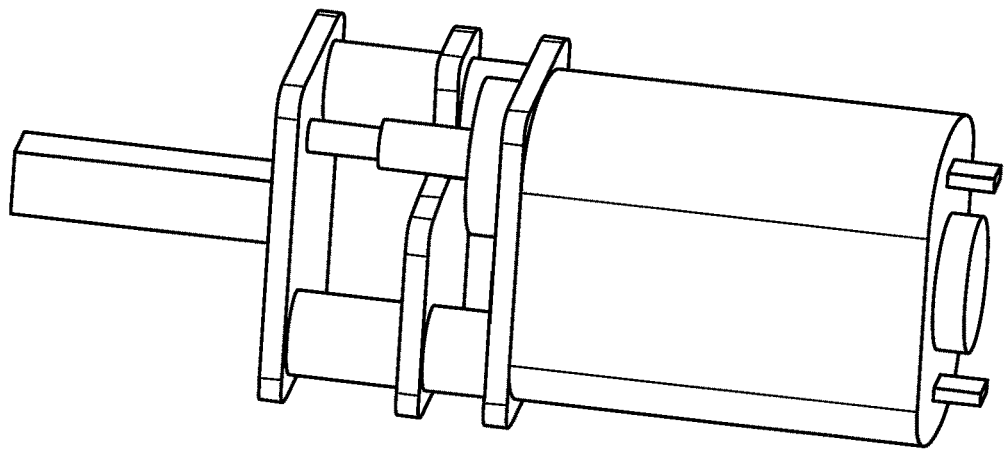
FIG. 3C is an isometric view of a rotating motor of the sun shield system of FIG. 3A.
Figure 3D:
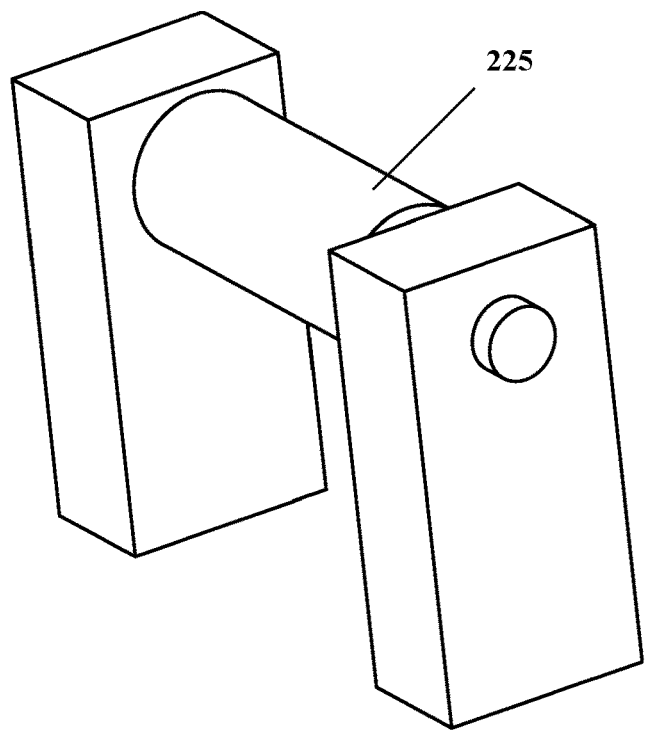
FIG. 3D is an isometric view of a retaining bar of the sun shield system of FIG. 3A.

FIG. 3A is an exploded isometric view depicting an exemplary embodiment of an automated retractable sun shield system 200, wherein a sun shield 210 of the sun shield system 200 is retracted and stored. FIG. 3B is an isometric view of a deployment mechanism 200 of the sun shield system 200 of FIG. 3A, wherein a motor 221 is installed at the upper end of the deployment mechanism 200. FIG. 3C is an isometric view of a rotating motor 221 of the sun shield system 200 of FIG. 3A. FIG. 3D is an isometric view of a retaining bar 224 of the sun shield system 200 of FIG. 3A.

Figure 4:
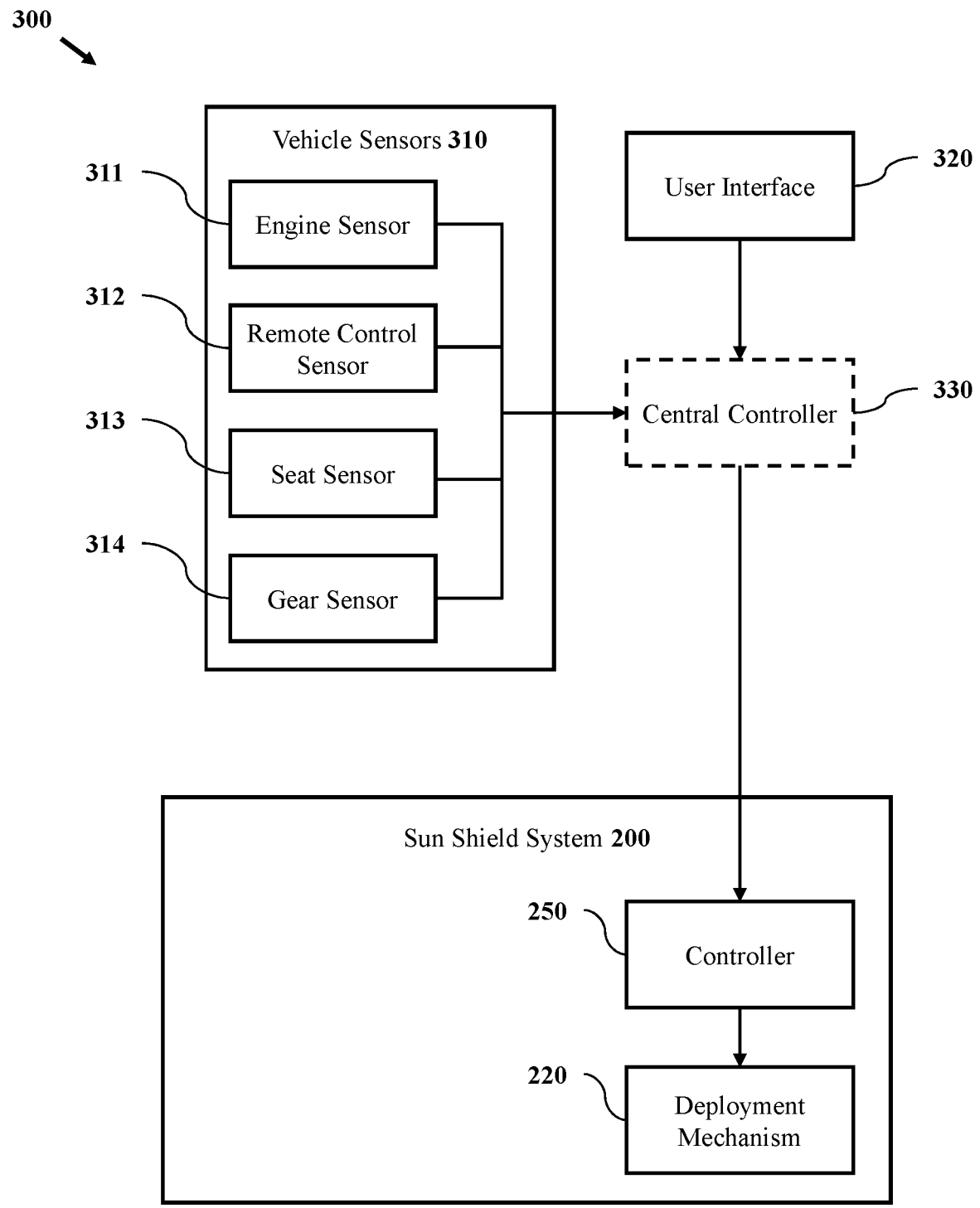
FIG. 4 is a graphical representation of an exemplary embodiment of a network of vehicle systems.

In one embodiment, the sun shield system 200 comprises a sun shield 210 (presented in a rolled configuration in FIG. 3A), a deployment mechanism 220, a roller 230, a tension bar 240, and a controller 250 (see FIG. 4). In one embodiment, the sun shield 210 includes a flexible material which blocks sunlight. In another embodiment, the sun shield 210 partially blocks sunlight, wherein the included flexible material partially blocks sunlight and partially permits sunlight to pass through. In one embodiment, the sun shield 210 includes a reflective material. In one embodiment, the deployment mechanism 220 operates to deploy and retract the sun shield 210.

In one embodiment, the deployment mechanism 220 operates to deploy and retract the sun shield 210. In one embodiment, the deployment mechanism 220 comprises at least one rotating motor 221, a plurality of motor chains 222, a plurality of guide rails 223, and a plurality of retaining bars 224. In one embodiment, the at least one motor 221 drives the deployment and retraction of the sun shield 210. In one embodiment, each motor chain 222 translates the rotary motion of the at least one motor 221 into a linear motion of the sun shield 210. The at least one motor 221 depicted in FIG. 3A is placed at the bottom end of the deployment mechanism 220, coaxial with the roller 230, but the at least one motor 221 may be located elsewhere. For example, as depicted in FIG. 3B, the at least one motor 221 is placed at the upper end of the deployment mechanism 220. In one embodiment, each guide rail 223 acts as a guide for one of the motor chains 222 in the plurality of motor chains. In one embodiment, the sun shield 210 includes at least one anchor 211 connecting the sun shield 210 to one of the motor chains 222 such that as the motor chain 222 moves, so does the sun shield 210. In one embodiment, each guide rail 223 acts as a guide for the linear motion of the sun shield 210 as the sun shield deploys or retracts. In one embodiment, the linear motion of the sun shield 210 as it deploys or retracts may follow a path along the length of at least one guide rail 223. In one embodiment, the at least one guide rail 223 may run parallel to the vertical opening 135 of the interior trim 131 of the at least one vertical support 130. In one embodiment, elements of the deployment mechanism 220 may be mounted on or extend generally along a vehicle structural member such as the at least one vertical support 130. In another embodiment, each retaining bar 224 provides tension at one end of one of the motor chains 222 in the plurality of motor chains by means of a roller 225 attached to each retaining bar 224; the at least one motor 221 may be located at the opposite end of one of the motor chains 222. In one embodiment, the at least one motor 221 is at the lower end of the deployment mechanism 220 and may be installed and concealed underneath the dashboard valence panel 120.

In another embodiment, the at least one motor 221 is at the upper end of the deployment mechanism 220 and may be installed and concealed underneath the interior trim 131 of the at least one vertical support 130.

In one embodiment, when the sun shield 210 is retracted and stored, the sun shield 210 wraps around the roller 230 so that the sun shield 210 is in a rolled configuration when the sun shield 210 is retracted and stored. While the sun shield 210 is in the rolled configuration, the sun shield 210 does not block light from passing through and allows an operator of the vehicle 100 to see through the vehicle windshield 110 clearly.

In one embodiment, when the sun shield 210 is deployed or partially deployed, the tension bar 240 guides the sun shield to match a shape of the tension bar 240. In this respect, the tension bar 240 may function similarly to a tent pole or an awning pole except that the tension bar 240 is not fixed in place to a specific segment of the sun shield 210. Instead, the tension bar 240 may stay in a fixed position between the roller 230 and the deployment mechanism 220 while the sun shield 210 moves between a deployed configuration and the rolled configuration.

In one embodiment, at least one of the roller 230 and the tension bar 240 is concealed and installed beneath the dashboard valence panel 120. The dashboard valence panel 120 may include a horizontal opening 125 through which the sun shield 210 may pass when deploying while keeping the concealed components out of sight and protecting the components from damage. In one embodiment, at least one element comprising the deployment mechanism 220 is installed and concealed behind an interior trim 131 covering a vertical support 130 of the vehicle. The interior trim 131 of the vertical support 130 may include a vertical opening 135 through which the sun shield 210 may pass when deploying while keeping the concealed components out of sight and protecting the components from damage.

FIG. 4 is a graphical representation of an exemplary embodiment of a network of vehicle systems 300. In one embodiment, the vehicle 100 may include a plurality of vehicle systems 300, the plurality of vehicle systems 300 including but not limited to a plurality of vehicle sensors 310, a user interface 320, a central controller 330, and the sun shield system 200. Each vehicle system in the plurality of vehicle systems 300 may be linked with some or all of the other vehicle systems in the plurality of vehicle systems 300 in a network. In one embodiment, each vehicle system in the plurality of vehicle systems 300 may send input signals to other vehicle systems in the plurality of vehicle systems 300 and receive input signals from other vehicle systems in the plurality of vehicle systems 300.

In one embodiment, the vehicle sensors 310 may be configured to detect state changes and send input signals related to the state changes to other vehicle systems in the plurality of vehicle systems 300. The plurality of vehicle sensors 310 may include, but is not limited to, an engine sensor 311, a remote control sensor 312, a seat sensor 313, and a gear sensor 314. The controller 250 of the sun shield system 200 may deploy or retract the sun shield 210 when the controller 250 receives an input signal from at least one of the vehicle sensors 310. For example, the controller 250 may be configured to deploy the sun shield 210 when the engine sensor 311 sends an input signal indicating that an engine of the vehicle 100 has been turned off, or the controller 250 may be configured to deploy the sun shield 210 when the gear sensor 314 sends an input signal indicating that a gear of the vehicle 100 has been shifted to a park gear state. Similarly, the controller 250 may be configured to retract the sun shield 210 when the engine sensor 311 sends an input signal indicating that an engine of the vehicle 100 has been turned on.

In one embodiment, the controller 250 of the sun shield system 200 may receive and respond to an input signal from a user interface 320 of the vehicle 100. An occupant of the vehicle 100 may control the sun shield system by means of the user interface 320, configuring the sun shield system 200 to respond to certain input signals from other vehicle systems 300 or operating the sun shield system 200 manually.

In one embodiment, a central controller 330 may coordinate the input signals coming and going from the other vehicle systems 300. In another embodiment, the vehicle systems 300 may send and receive input signals to each other directly or by means of a central bus.

While this disclosure makes reference to exemplary embodiments, it will be understood by those skilled in the art that various changes in form and details may be made therein without departing from the scope of the claimed embodiments.

What is claimed is:

1. An automated retractable sun shield system for a vehicle, wherein the sun shield system comprises:
   a sun shield including a flexible material configured to block sunlight from passing through the material;
   a deployment mechanism configured to control the deployment and retraction of the sun shield;
   a roller, wherein the sun shield wraps around the roller so that the sun shield is in a rolled configuration when the sun shield is retracted and stored;
   a tension bar, wherein the tension bar guides the sun shield to form a shape matching the shape of the tension bar when the sun shield is deployed;
   a controller, wherein the controller receives input from at least one system of the vehicle and controls the operation of the sun shield system according to the received input;
   wherein the deployment mechanism comprises:
   at least one rotating motor for driving the deployment and retraction of the sun shield;
   a plurality of motor chains, each motor chain translating the rotary motion of the at least one motor into a linear motion of the sun shield;
   a plurality of guide rails, each guide rail acting a guide for the linear motion of the sun shield; and
   a plurality of retaining bars, each retaining bar providing tension at one end of one of the motor chains in the plurality of motor chains.

2. The sun shield system of claim 1, wherein the roller is installed and concealed behind a dashboard valence panel of the vehicle.

3. The sun shield system of claim 1, wherein one of the plurality of chains is installed and concealed behind an interior trim covering a vertical support of the vehicle.

4. The sun shield system of claim 1, wherein the sun shield is configured to deploy upwardly away from the roller.

5. The sun shield system of claim 1, wherein the controller deploys the sun shield when the controller receives an input signal indicating that an engine of the vehicle has been turned off or an input signal indicating that the vehicle has shifted to a park gear state.

6. The sun shield system of claim 1, wherein the controller retracts the sun shield when the controller receives an input signal indicating that an engine of the vehicle has been turned on.

7. A vehicle including an automated retractable sun shield system, wherein the sun shield system comprises:
- a sun shield including a flexible material configured to block sunlight from passing through the material;
- a deployment mechanism, wherein the deployment mechanism operates to deploy and retract the sun shield;
- a roller, wherein the sun shield wraps around the roller so that the sun shield is in a rolled configuration when the sun shield is retracted and stored;
- a tension bar, wherein the tension bar guides the sun shield to form a shape matching a shape of the tension bar when the sun shield is deployed; and
- a controller, wherein the controller receives input from other systems of the vehicle and controls the operation of the sun shield system according to the received input;
- wherein the deployment mechanism comprises:
- at least one rotating motor for driving the deployment and retraction of the sun shield;
- a plurality of motor chains, each motor chain translating the rotary motion of the at least one motor into a linear motion of the sun shield;
- a plurality of guide rails, each guide rail acting as as a guide for the linear motion of the sun shield; and
- a plurality of retaining bars, each retaining bar providing tension at one end of one of the motor chains in the plurality of motor chains.

8. The vehicle of claim 7, wherein the sun shield is stored behind a dashboard valence panel of the vehicle.

9. The vehicle of claim 7, wherein each of the plurality of guide rails are concealed behind an interior trim covering a vertical support of the vehicle.

10. The vehicle of claim 7, wherein deployment of the sun shield includes deploying the sun shield in an upwards direction.

11. The vehicle of claim 7, wherein the controller deploys the sun shield when the controller receives an input signal indicating that an engine of the vehicle has been turned off or an input signal indicating that the vehicle has shifted to a park gear state.

12. The vehicle of claim 7, wherein the controller retracts the sun shield when the controller receives an input signal indicating that an engine of the vehicle has been turned on.

13. A deployment mechanism for an automated retractable sun shield system, wherein the sun shield system comprises:
- a sun shield including a flexible material configured to block sunlight from passing through the material;
- the deployment mechanism, wherein the deployment mechanism operates to deploy and retract the sun shield;
- a roller, wherein the sun shield wraps around the roller so that the sun shield is in a rolled configuration when the sun shield is retracted and stored;
- a tension bar, wherein the tension bar guides the sun shield to form a shape matching a shape of the tension bar when the sun shield is deployed;
- a controller, wherein the controller receives input from other systems of the vehicle and controls the operation of the sun shield system according to the received input;
- wherein the deployment mechanism comprises:
- at least one rotating motor for driving the deployment and retraction of the sun shield;
- a plurality of motor chains, each motor chain translating the rotary motion of the at least one motor into a linear motion of the sun shield;
- a plurality of guide rails, each guide rail acting as as a guide for the linear motion of the sun shield; and
- a plurality of retaining bars, each retaining bar providing tension at one end of one of the motor chains in the plurality of motor chains.

14. The deployment mechanism of claim 13, wherein at least one of the retaining bars is installed and concealed behind an interior trim covering a vertical support of the vehicle.

15. The deployment mechanism of claim 13, wherein the sun shield is configured to deploy upwardly away from the roller.

16. The deployment mechanism of claim 13, wherein the controller deploys the sun shield when the controller receives an input signal indicating that an engine of the vehicle has been turned off or an input signal indicating that the vehicle has shifted to a park gear state.

17. The deployment mechanism of claim 13, wherein the controller directs the sun shield to retract when the controller receives an input signal indicating that an engine of the vehicle has been turned on.

* * * * *